United States Patent

[11] 3,602,294

[72] Inventor Leon J. Wanson
 118, Avenue Isidore Gheyskens,
 Auderghem, Belgium
[21] Appl. No. 817,516
[22] Filed Apr. 18, 1969
[45] Patented Aug. 31, 1971

[54] SAFETY SYSTEM TO BE USED IN HEATING OR COOLING PLANTS
 2 Claims, 2 Drawing Figs.
[52] U.S. Cl. .................................................. 165/11, 165/22
[51] Int. Cl. .................................................. F24f 3/00
[50] Field of Search.......................................... 165/11, 12, 70, 22

[56] References Cited
 UNITED STATES PATENTS
 3,236,292  2/1966  Smith, Jr. ..................... 165/11
 3,272,258  9/1966  Bourquard ..................... 165/11

Primary Examiner—Charles Sukalo
Attorney—Sughrue, Rothwell, Mion, Zinn & Macpeak ABSTRACT: The system comprises a control device operated by a signal that is equal to the difference between a first signal emitted by a first element responsive to volume variations of the heat transfer fluid contained in the plant, and a second signal emitted by at least a second element responsive to variations of the fluid temperature.

SAFETY SYSTEM TO BE USED IN HEATING OR COOLING PLANTS

FIELD OF THE INVENTION

The present invention relates to a safety system for watching over excess or shortage of liquid within any type of heating or cooling plants employing heat transfer fluids, and more specifically, for detecting leaks of minor importance (i.e. those not exceeding 70 percent of the volume corresponding to the expansion caused by the variations of temperature differential between initial and end point of the plant, said variations being due to the changes occuring in the prevailing heating conditions).

BACKGROUND OF THE INVENTION

It has already been proposed to detect these leaks in a heat transfer fluid plant by watching over the level of the heat transfer fluid present in the well-known expansion vessel. However, detection is impaired owing to the effect of temperature. When a safety device installed within the expansion vessel is designed for responding whenever the fluid level in said vessel falls below a determined value, and, when said device is adjusted on a cold plant, it will not be able to operate in said plant when warm, unless the loss of an amount of fluid corresponding to the total expansion of the fluid contained in the plant has previously arisen. In the same way, a safety device designed for responding when the fluid in the vessel exceeds a predetermined level will only operate, in case of accidental introduction of fluid into the plant when cold, if the amount introduced exceeds the predetermined volume of expansion.

Detection of a variation of the total amount of fluid in the plant on the basis of the variations of the level of the fluid in the expansion vessel needs correcting the readings from the influence of temperature.

SUMMARY OF THE INVENTION

Since the variations of the volume of fluid present in the expansion vessel (or the level variations that are proportional therewith when the section of the expansion vessel is constant) are equal to the algebraic sum of the variations caused by the leaks (or by the additions) and of the variations due to thermal expansion, the idea on which the present invention is based consists in substracting from the total variations as observed, those that have to be attributed to the variations of expansion (which are themselves proportional to the variations of temperature).

That idea has been put into practice according to the present invention by providing a system which automatically makes that substraction and that only provides a reading (or a signal energizing a relay which controls an alarm) in the case of leak or addition of fluid in the plant. The system according to the present invention is characterized in that it comprises a control device operated by a signal that is equal to the difference between a first signal emitted by a first element operating in response to volume variations of the heat transfer fluid contained in the plant and a second signal emitted by at least a second element operating in response to variations of the fluid temperature.

According to a preferred embodiment of the present invention, wherein the control device is influenced by the level of fluid contained in an expansion vessel of constant cross-sectional area connected with the thermal plant, said first element is a variable resistor controlled by a floater that operates responsive to the level of heat transfer fluid contained in the expansion vessel, the resistance of said variable resistor decreasing when the level increases, the second element is a second variable resistor, controlled by a thermometer sensitive to the temperature of the fluid at some point of the plant, the resistance of said second variable resistor increasing when the temperature increases, said control device being an instrument that is sensitive to electric current and connected in parallel with said two resistors and an electric current source.

DRAWINGS

The attached drawings illustrate examples of embodiments of the present invention. In these drawings.

The same references designate elements that are similar or correspondent in the different drawings.

DESCRIPTION

Figure 1:
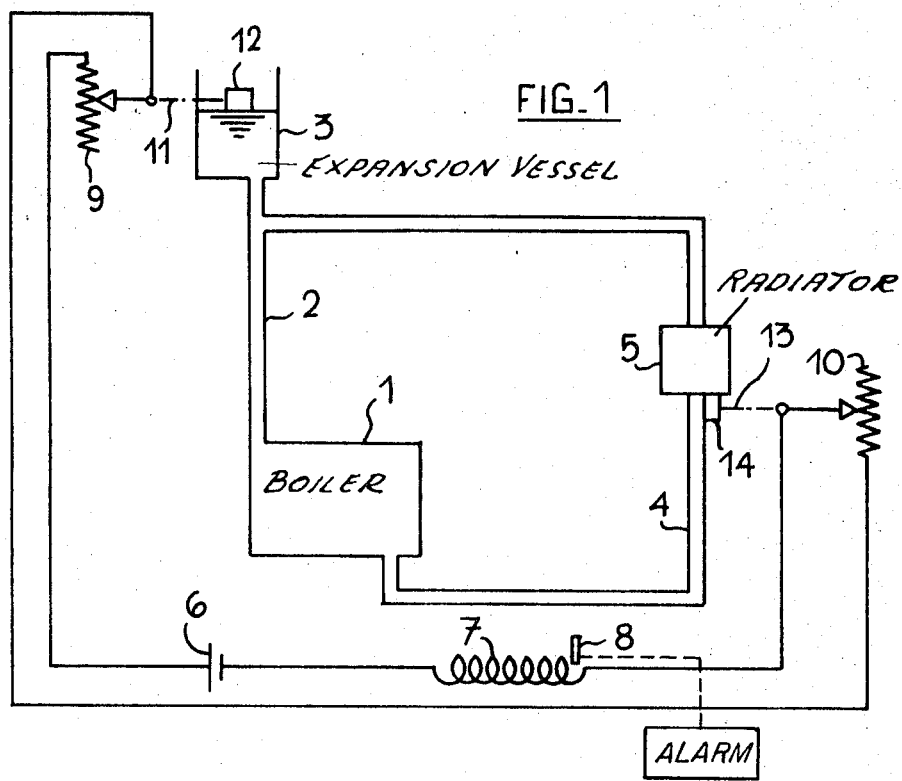
FIG. 1 is a diagram of a plant according to the present invention.

FIG. 1 schematically illustrates a central heating plant including a boiler 1, an uptake conduit 2 ending into an expansion vessel 3, and a downcomer conduit 4 provided with a radiator 5 inserted therein. The control circuit comprises a closed loop in which are connected an electric current source 6, a relay coil 7 attracting an armature 8 the displacement of which in both directions, when important enough, will operate an alarm device 15 and two variable resistors 9, 10. The sliding contact of resistor 9 is controlled (through an appropriate connection that is symbolized by dotted lines 11) by a floater 12 carried by the heat transfer liquid contained in the expansion vessel 3, the displacement of which follows that of the free level of the fluid. Connection 11 is established in such a way that when the floater rises up, the part of resistor 9 that is introduced into the circuit decreases (and conversely). The sliding contact of variable resistor 10 is controlled (through an appropriate connection that is symbolized by dotted lines 13) by a thermometrical device 14 that is operated responsive to the temperature prevailing in the heat transfer fluid at the output of radiator 5. Connection 13 is established in such a way that when said temperature increases, the part of resistor 10 that is introduced into the circuit increases (and conversely). When thermal exchange between radiator 5 and ambient atmosphere remains unchanged, the strength of the current energizing coil 7 will only depend on resistor 9, i.e. on the position of the floater 12 which in turn depends on the variations of the total mass of the heat transfer fluid contained in the plant, If said mass decreases owing to a leak, descent of the floater 12 will cause an increase of the resistance of the circuit, and consequently, a decrease of the strength of current passing through the coil 7. The position of the armature 8 will be consequently modified and an alarm delivered when the descent of level of the fluid, as caused by the leak will reach a determined value revealing an intolerable leak. The same would occur, but in opposite direction should accidentally heat transfer fluid be introduced into the plant with the result of causing floater 12 to rise beyond a predetermined level. The strength of current passing through coil 7 would then be greater and the armature 8 would then reach another threshold position that would cause an alarm to be delivered. If the heat transfer fluid of the plant is brought to an elevated temperature, expansion of the fluid will occur, causing thereby a rising up of the floater 12, a decrease of the strength of the current passing through the coil 7, and a displacement of the armature 8 which would be out of proportion as to possible variations of the total mass of the heat transfer fluid. The readings given by the control apparatus would thus be made false. But the increase of fluid temperature sensed by thermometrical device 14 introduces a variation of the resistance of resistor 10 that tends to compensate the influence (disturbed by the expansion) of resistor 9 upon the strength of the current passing through the circuit. In other words, the threshold of operation of the warning device would not be modified in relation with its position in the preceding case, where it was assumed that the sliding contact of resistor 10 was unmoved. Should the temperature of the system decrease, the sliding contact of resistor 10 would introduce a less resistance into the circuit. However, since the expansion of the heat transfer fluid would then also decrease, floater 12 would lower and this could result in a reintroduction of a fraction of the resistance of the resistor 9 into the circuit, in such a way that the prevailing conditions of relay 7 would not be subjected to disturbances. It can be seen that under the action of temperature differentials, the sliding contacts of resistors 9, 10 rise or lower together.

The action exerted by temperature upon the variable resistor 10 may be established once forever. The action exerted by the level of heat transfer fluid upon resistor 9 will be adapted to the variation of level, which in turn will correspond to variation of the fluid expansion, said expansion being a function of the temperature and of the total amount of fluid in the system.

Figure 2:
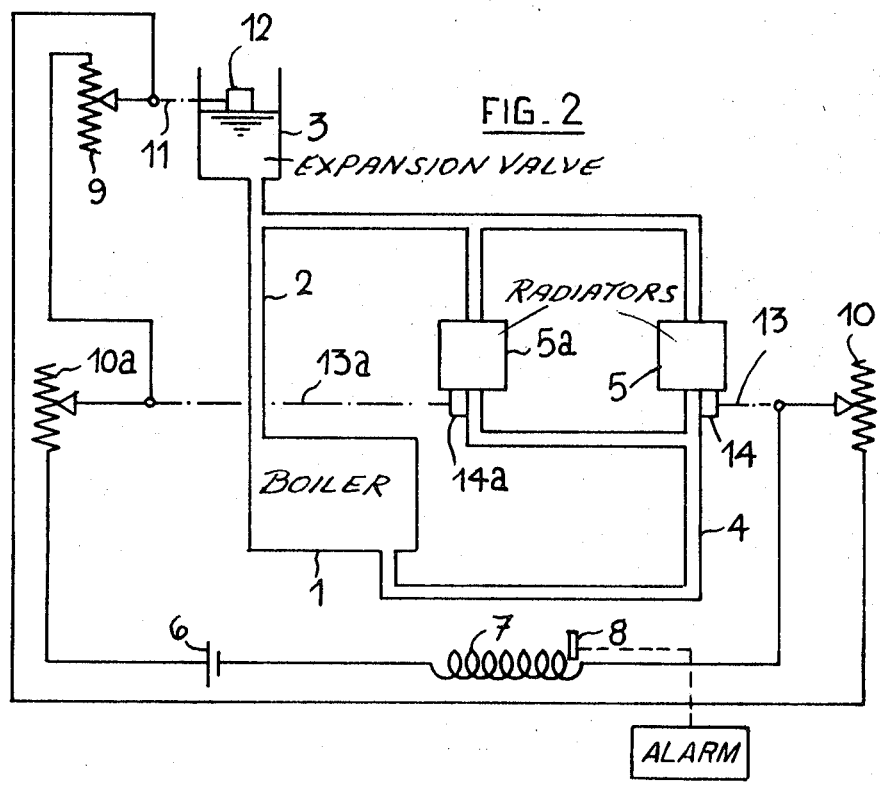
FIG. 2 is a similar diagram of a plant including two heat exchange devices.

FIG. 2 represents a plant comprised with two heat utilization circuits that are mounted in parallel connection, the first one containing a radiator 5, the second one a radiator 5a. The latter may be separated from the whole by means of a valve 15; it is comprised with a thermometrical device 14a controlling a variable resistor 10a through the medium of a connection 13a which operates in the same way as connection 13. Variable resistors 10, 10a are connected in series in the aiding directions. Obviously there may be provided as many variable resistors as there are circuit parts liable to be insulated from each other. It is then understood that variable resistors would only be inserted in the partial circuits, the volume of which could be sufficient to allow them to have an effective influence on the fluid level in the expansion vessel.

What is claimed is:

1. A safety system for monitoring an excess or lack of fluid in heading or cooling plants comprising:
   a. a boiler;
   b. heat exchanger means;
   c. temperature sensing means for sensing the temperature of the fluid in said heat exchanger means;
   d. tubing means interconnecting said boiler means and said heat exchanger means for forming a closed circuit;
   e. an expansion vessel connected to said closed circuit, said expansion vessel containing a float responsive to the level of said fluid in said expansion vessel; and
   f. an electrical safety circuit means comprising a series circuit of
      1. an electrical power supply;
      2. a first variable resistance means connected to said float for producing a resistance indicative of the position of said float;
      3. second variable resistance means connected to said temperature sensing means for producing a resistance indicative of the temperature of said fluid in said heat exchanger means;
      4. a relay means comprising a coil and an armature wherein the current in said armature is a function of the resistance of said first and second variable means, whereby said armature is moved in accordance with the current in said coil; and
      5. means coupled to said armature for providing an indication in response to the movement of said armature.

2. The system of claim 1 wherein
   a. said heat exchanger means comprises a plurality of heat exchangers;
   b. said temperature sensing means comprises one temperature sensing means for each of one of said plurality of heat exchangers; and
   c. said second variable resistance means comprises one variable resistance means for each of said temperature sensing means.